(12) United States Patent
Jayanthi et al.

(10) Patent No.: US 9,898,760 B2
(45) Date of Patent: **\*Feb. 20, 2018**

(54) DIGITAL PLAQUE MEDIA PANEL AND INFRASTRUCTURE

(71) Applicants: Madhavi Jayanthi, Laguna Niguel, CA (US); Bindu Rama Rao, Laguna Niguel, CA (US)

(72) Inventors: Madhavi Jayanthi, Laguna Niguel, CA (US); Bindu Rama Rao, Laguna Niguel, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/178,880

(22) Filed: Jun. 10, 2016

(65) Prior Publication Data

US 2016/0292745 A1    Oct. 6, 2016

Related U.S. Application Data

(63) Continuation-in-part of application No. 14/887,113, filed on Oct. 19, 2015, which is a continuation of
(Continued)

(51) Int. Cl.
| | | |
|---|---|---|
| G06F 15/16 | (2006.01) |
| G06Q 30/02 | (2012.01) |
| G06Q 50/20 | (2012.01) |
| G06F 17/30 | (2006.01) |
| G06Q 10/02 | (2012.01) |
| H04L 29/06 | (2006.01) |
| G06Q 20/34 | (2012.01) |
| G07F 7/08 | (2006.01) |
| G07F 7/10 | (2006.01) |
| H04L 29/08 | (2006.01) |
| G06Q 20/00 | (2012.01) |

(52) U.S. Cl.
CPC ... *G06Q 30/0269* (2013.01); *G06F 17/30867* (2013.01); *G06F 17/30896* (2013.01); *G06F 17/30905* (2013.01); *G06F 17/30994* (2013.01); *G06Q 10/02* (2013.01); *G06Q 20/00* (2013.01); *G06Q 20/3574* (2013.01); *G06Q 30/0256* (2013.01); *G06Q 50/20* (2013.01); *G07F 7/0806* (2013.01); *G07F 7/1008* (2013.01); *H04L 29/08855* (2013.01); *H04L 67/42* (2013.01)

(58) Field of Classification Search
USPC ....... 709/203, 217, 219, 223, 224, 226, 228, 709/231, 232, 238; 715/255; 725/25; 348/739
See application file for complete search history.

(56) References Cited

U.S. PATENT DOCUMENTS 7,454,698 B2 * 11/2008 Kohda .............. G06F 17/30011
                                                                    707/E17.008
7,536,316 B2 *  5/2009 Ozer ...................... G06Q 30/02
                                                                    705/14.47

(Continued)

*Primary Examiner* — Quang N Nguyen

(57) ABSTRACT

A digital plaque media panel that displays a certificate, the educational institution associated with the certificate currently displayed on the digital plaque media panel is an alma mater associated with the individual user. The digital plan media panel receives and displays alma mater related news and information, periodically or as needed, to the individual user based on a configuration. An alumni updates and advertisement infrastructure provides alma mater related news and information.

18 Claims, 3 Drawing Sheets

Related U.S. Application Data application No. 13/939,144, filed on Jul. 10, 2013, now Pat. No. 9,197,484, which is a continuation of application No. 13/371,092, filed on Feb. 10, 2012, now Pat. No. 8,489,681, which is a continuation of application No. 12/156,813, filed on Jun. 5, 2008, now Pat. No. 8,150,909.

(56) References Cited

U.S. PATENT DOCUMENTS

| | | | | |
|---|---|---|---|---|
| 2003/0144843 | A1* | 7/2003 | Belrose | H04N 1/00127 704/270.1 |
| 2006/0170669 | A1* | 8/2006 | Walker | G06F 3/0362 345/418 |
| 2008/0201420 | A1* | 8/2008 | Wong | H04L 51/04 709/204 |
| 2009/0295991 | A1* | 12/2009 | Stafford | G09G 5/12 348/500 |

\* cited by examiner

DIGITAL PLAQUE MEDIA PANEL AND INFRASTRUCTURE

CROSS REFERENCES TO RELATED APPLICATIONS

The present invention is a continuation-in-part (CIP) of, claims priority to, and makes reference to U.S. application Ser. No. 14/887,113 filed Oct. 19, 2015, titled "Server Infrastructure for Digital Plaque Displaying Certificates, Updates and Status", which in turn is a continuation of, claims priority to and makes reference to U.S. application Ser. No. 13/939,144 filed Jul. 10,2013 and patented as U.S. Pat. No. 9,197,484, which is a continuation of U.S. application Ser. No. 13/371,092 filed Feb. 10, 2012 and patented as U.S. Pat. No. 8,489,681, which in turn is a continuation of, claims priority to and makes reference to U.S. application Ser. No. 12/156,813 filed Jun. 5, 2008 and patented as U.S. Pat. No. 8,150,909. The complete subject matter of the above-referenced United States Patent Applications are hereby incorporated herein by reference in their entirety.

BACKGROUND

1. Technical Field

The present invention relates generally to displaying a certificate on a plaque and interacting with alumni.

2. Related Art

People who graduate from a college display their graduation certificates on a plaque on their walls. Dentists and doctors not only attend colleges but also take specialization courses, advanced courses etc. and they have several different plaques on display in their workplaces. However, at best, these plaques, with certificates, remind the individual of their school, their friends and about their universities. These plaques do not promote interactions with their schools, with their friends, or with alumni. Rather, they just testify as to the educational background of a person.

The present invention rectifies these deficiencies by providing new digital plaques that, unlike old plaques that hold graduation certificates but do nothing else, now provide several new and useful features. The present invention therefore provides for better and more advanced plaques that enable better and improved interactions between an alum and his alma mater, etc.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
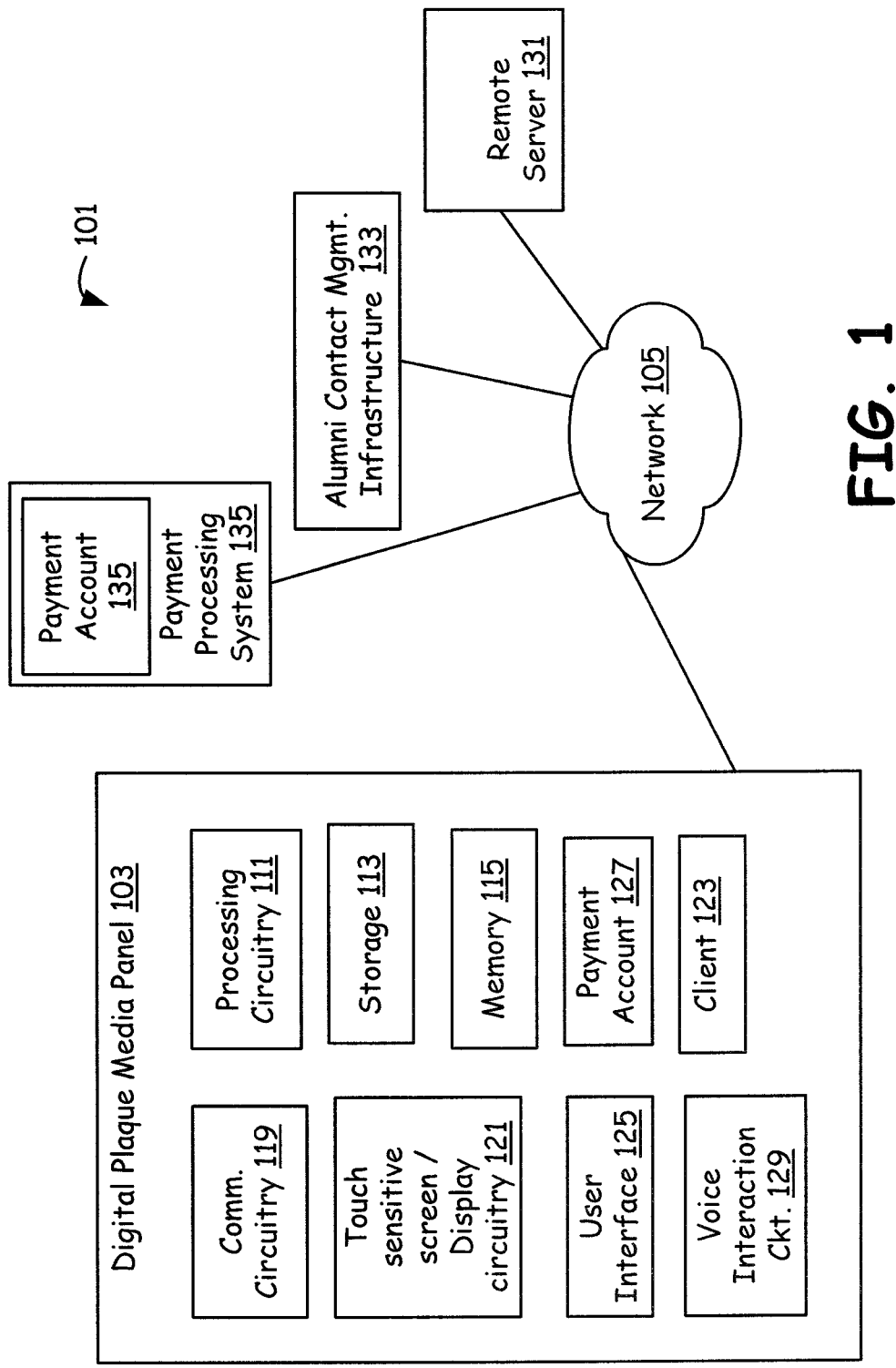
FIG. 1 is a perspective block diagram of an alumni updates and advertisement infrastructure 101 comprising an alumni contact management infrastructure, a payment account, and a digital plaque media panel that displays certificates and provides for user interactions.

FIG. 1 is a perspective block diagram of an alumni updates and advertisement infrastructure 101 comprising an alumni contact management infrastructure 133, a payment account 135, and a digital plaque media panel 103 that displays certificates and provides for user interactions. The digital plaque media panel 103 programs the alumni contact management infrastructure 133 to deliver alumni news updates, offers and advertisements. The alumni contact management infrastructure 133 delivers updates to alumni news, alma mater news, events information, offers and advertisements, via an update channel for display to the user on the digital plaque media panel 103. The digital plaque media panel 103 displays a graduation certificate or some other certificate typically associated with an educational institution that alumni of colleges usually display in a plaque. It also receives and displays advertisements from the alumni contact management infrastructure 133 securely.

The digital plaque media panel 103 comprises a processor circuitry 111, a communications circuitry 119 and a touch sensitive screen/display circuitry 121 that interacts with the processor circuitry 111, and under instructions from the processor circuitry 111, retrieves and displays for one individual user a series of certificates, one after another in random order or in a specified order. The digital plaque media panel 103 also comprises a voice interaction circuitry 129 employed by the individual user to interact with the digital plaque media panel 103. The processor circuitry 111 receives promotional material tailored for that individual user and displays it on the touch sensitive screen/display circuitry 121, and in response, receives and process user queries and user responses via the voice interaction circuitry 129 and the processor circuitry 111 selectively conducts follow up transactions for the individual user.

The digital plaque media panel 103 displays a series of certificates in some configurations, and only one certificate in some other configurations. The series of certificates comprise one or more of graduation certificates, advanced training certificates, course completion certificates, transcripts and test score certificate. For example, the series of certificates comprise one or more certificates issued by and associated with an educational institution, such as Stanford University. An alumni of Stanford University would use the digital plaque media panel 103 to display a graduation certificate in digital form, while also displaying alumni news, when appropriate, employing small sections of the screen/display circuitry 121, such as a banner at the bottom. Tickets for sale for a Stanford football game over a weekend are displayed in a small box in the corner, and if selected by a user, a layout or a map of the Stanford football stadium is displayed, with appropriate user interactions provided/enabled for selection of seats and completion of a sales transaction.

The digital plaque media panel 103 supports voice queries by a user and provides audio responses, video response, etc.

as appropriate, based on configuration. For example, the processor circuitry 111 of the digital plaque media panel receives user queries via the voice interaction circuitry 129 and communicates it to a remote server 131 for deciphering intent and questions, and in response receives information and data for display.

In one embodiment, the digital plaque media panel 103 receives from a server in the alumni updates and advertisement infrastructure 101 user specific data for display that comprise an update to one of the currently displayed series of certificates. For example, if the user has currently displayed a graduation certificate with an Economic major from a university, the update provided is information for a program leading to a Certificate of Finance at the same university (which would be the alma mater of the user from where the graduation certificate was given).

In a related embodiment, the alumni contact management infrastructure 133 sends to the digital plaque media panel 103 information for display that comprises a price for a product or service available, or for a service requested. For example, the information could be an offer for sale of spirit wear of the university associated with the certificate currently on display. The information also comprises, for example, shirts, jackets and pants on sale with the logo of the university that are currently available for sale via the alumni network of the university, or available for sale at a bookstore at the university.

In one embodiment, the digital plaque media panel 103 displays offers to the user for tickets to sports events at a university (alma mater of the user)—the information having been sent to the user by the alumni contact management infrastructure. The offer for the tickets is displayed, for example, as a message in a tiny portion of the digital plaque media panel, such as at the bottom right corner. Upon selection/activation of the message by a user, details of the offer for the tickets are retrieved (if necessary) and provided to the user. For example, details received includes available ticket information, dates, prices and seating information. The seating information comprises a map for further interactions with the individual user—seat selections being facilitated by interactions with the touch sensitive map on the touch sensitive screen provided by the digital plaque media panel 103.

In configurations where a touch sensitive screen 121 is not available, the digital plaque media panel 103 provides for keyboard-based interactions, buttons based interactions (physical buttons or even software created button sometimes called soft-buttons), a remote control based interactions, etc. For example, a user interface 125 also supports user interactions via soft-keys and via keyboard entries and button actions.

In some configurations, the digital plaque media panel 103 provides not only touch sensitive interactions using a touch sensitive screen 121 (capacitive, resistive, OLED, etc.) it, in addition, also provides for keyboard based interactions, buttons based interactions, a remote control based interactions, etc.

In one configuration, the digital plaque media panel 103 displays, in sequence or randomly, one or more certificates issued by and associated with an educational institution that are retrieved from the alumni updates and advertisement infrastructure 101, wherein the educational institution is an alma mater associated with the individual user, and wherein the alumni updates and advertisement infrastructure 101 provides alma mater related news and information periodically or as needed to the individual user based on the configuration.

In one configuration the digital plaque media panel 103, the educational institution associated with the certificate currently displayed on the digital plaque media panel 103 is an alma mater associated with the individual user, wherein the digital plan media panel 103 receives and displays alma mater related news and information, periodically or as needed, to the individual user based on a configuration.

When the digital plaque media panel 103 receives information such as sales offers, tickets to sporting events, tickets to movies, etc., it displays them to the user, by, for example, initially providing a small tiny message in a small part of the screen 121 such as a corner or the bottom, and later when selected, providing more details. Thus, in a related embodiment, the individual user is prompted to purchase or reserve tickets to sporting events, tickets to social events, classes, spirit wear, books and memorabilia.

The digital plaque media panel 103 is used by a user to interact with the alma meter or with educational institutions where the user has obtained certificates, has taken classes, etc. In some configurations, upon receiving information on sports wins, on some major achievement at the university, or upon the breaking of some major news, the digital plaque media panel 103 attracts the user's attention to the related news/events. For example, when the educational institution is an alma mater of the individual user, based on configuration, the digital plaque media panel 103 automatically plays a video, displays flags and a mascot, or plays alma mater related songs when it receives notifications of a sports win, or other good news, from an alumni contact management infrastructure 133.

The payment account 127 is configured by the user to enable online purchases of tickets for sporting events and campus events, memorabilia, clothing with university or departmental logo such as jackets, hats, shirts, pants, exercise equipment, etc. The user can provide a primary payment account 127, and a secondary payment account too, along with shipping information. Gift purchases and delivery to other alumni is also supported, as are donations to charities and humanitarian causes arranged by the alumni networks, by campus organizations, by Greek groups on campus, etc. The alumni updates and advertisement infrastructure 101 also comprises a payment processing system 135 that comprises information on the payment account 135 which a user employs in conducting sales transactions initiated by the user from the digital plaque media panel 103.

In one embodiment, the various groups in an university that the user, an alum of a particular university, had previously associated himself with while on campus, via memberships and participation, are determined by the alumni contact management infrastructure 133, and used to determine the relevant news and relevant updates that are anticipated to be of interest to the user. For example, these various groups include Greek organizations on campus, musical groups such as bands, political activity groups, research groups, sports groups, clubs, etc.

In one embodiment, the alumni contact management infrastructure 133 comprises a plurality of servers that coordinate the delivery of services to the digital plaque media panel 103, such as user account management, secure communications management, provisioning of the digital plaque media panel 103, support for voice based search and retrieval of data by a user from the digital plaque media panel 103, updates to certificates currently displayed, delivery of alumni news and alma mater related news, etc.

In one embodiment, the digital plaque media panel 103 is modular, and several of its components can be plugged in or otherwise assembled to incorporate assembled features into a custom solution. For example, the touch sensitive screen display 121 is a separate unit or electronic device, as is the voice interaction circuitry 129, and these independent electronic devices are plugged in, snapped into, or communicatively coupled with a controller unit comprising the processing circuitry 111, user interface 125, storage 113, memory 115, pay account 127 and client 123. Thus different controllers of various capabilities are plugged into different types of touch sensitive screen display 121 (or even those that are not touch sensitive but provide video and image display capabilities, etc.) and in addition, a voice interaction circuitry 129 is plugged in to enhance user experience and make user interactions flexible. Such modular construction requiring simple assembly and reconfiguration benefits make this solution additionally unique.

Figure 2:
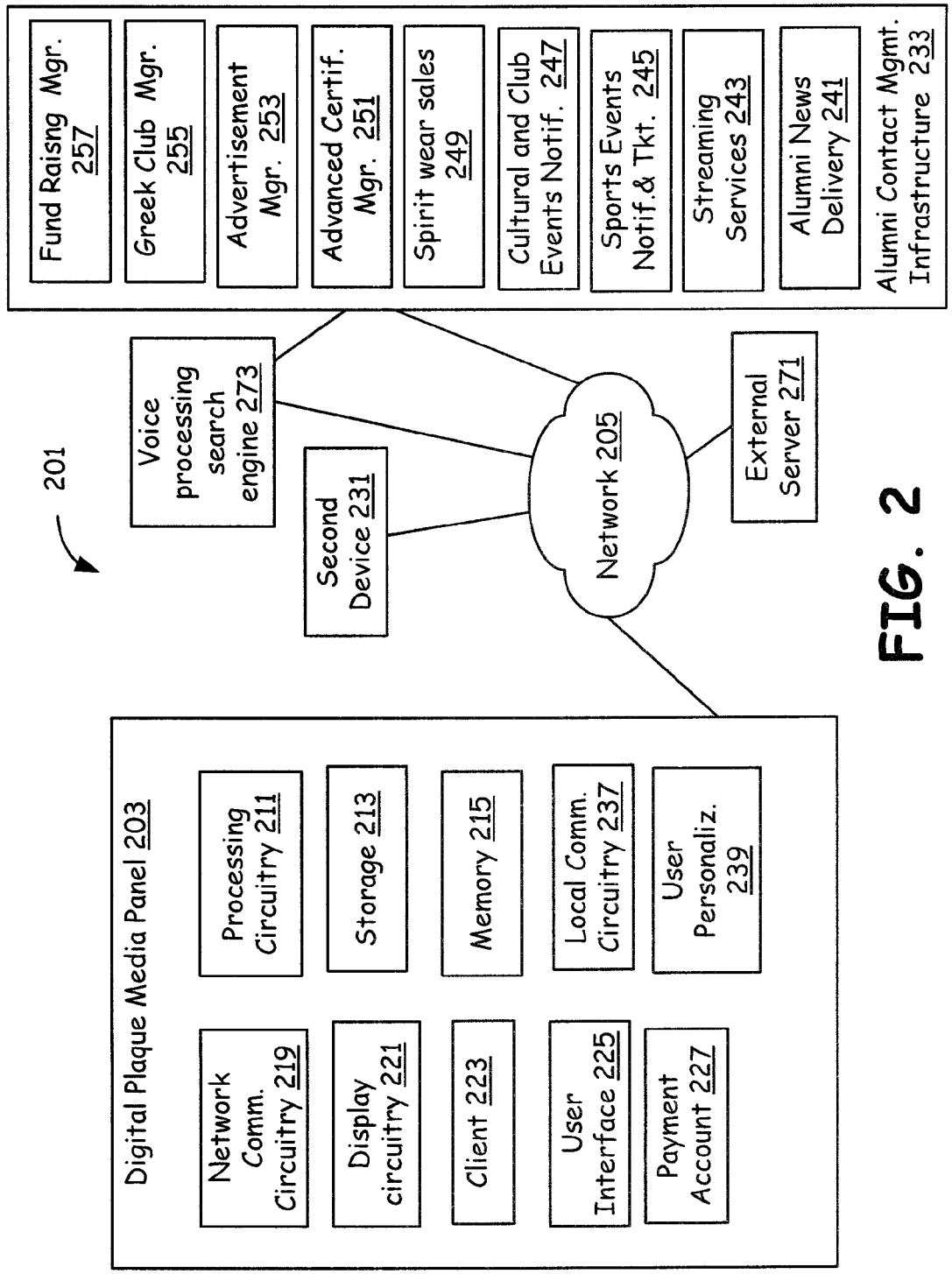
FIG. 2 is a perspective block diagram of another alumni updates and advertisement infrastructure comprising an alumni contact management infrastructure, a payment account and a digital plaque media panel that displays certificates and provides for user interactions.

FIG. 2 is a perspective block diagram of another alumni updates and advertisement infrastructure 201 comprising an alumni contact management infrastructure 233, a payment account 227 and a digital plaque media panel 203 that displays certificates and provides for user interactions.

The alumni updates and advertisement infrastructure 201 comprises secure communications means for communication between the alumni contact management infrastructure 233 and the digital plaque media panel 203 that displays certificates and provides for user interactions. It also has secure transaction processing means that uses the user's configured payment account 227 to purchase goods or services for the user (when triggered or approved by the user). The digital plaque media panel 203 programs the alumni contact management infrastructure 233 to deliver alumni news updates, offers and advertisements. The alumni contact management infrastructure 233 delivers updates to alumni news, alma mater news, events information, offers and advertisements, via an update channel. The digital plaque media panel 203 receives and displays advertisements from the alumni contact management infrastructure securely.

The alumni contact management infrastructure 233 is configured as a collection of servers or modules for providing the services of alumni news distribution, campus events news notifications, sales of spirit wear and tickets to sporting and non-sporting events (cultural, educational, etc.) and access to certificates for display on the digital plaque media panel 203. The alumni contact management infrastructure 233 therefore comprises a alumni news delivery services 241, streaming services 243 (such as streaming live classes, streaming recorded classes, streaming sports events, etc.) sports events notification & ticketing services 245 and a cultural and club events notification services 247. In addition, the alumni contact management infrastructure 233 also comprises a spirit wear sales services 249, an advanced certification manager 251 that determines advanced courses and certifications appropriate for a user based on the user's academic achievements and/or research interests, an advertisement manager 253 that determines the appropriate advertisements for a user (wherein the advertisements include notices on to jobs available on campus, research and teaching positions open on campus, etc.), a greek club manager 255 that communicates information on greek life on campus based on previous membership in a greek club on campus by the user, and a fund raising manager 257 that communicates information on fund raising activities on campus for various departments, clubs, research projects, etc.

In one configuration of the alumni updates and advertisement infrastructure 201, the digital plaque media panel 203 receives alumni news, alma mater news, events information, offers and advertisements comprises based on user personalization. For example, the user personalization comprises certificates on display on the digital plaque media panel and past payment transactions information, and the digital plaque media panel receives alumni news, information on events, information on tickets for sale for campus events, etc. from the university associated with the certificates on display on the digital plaque media panel, which often are the alma mater of the user. The digital plaque media panel 203 maintains a user personalization information 239 that is specified and maintained by the user, which is used by the alumni contact management infrastructure 233 selectively to determine alumni news, advertisements, spirit wear, courses and certifications, and sport events that are relevant to the user.

The certificates on display on the digital plaque media panel 203 originates from the alumni updates and advertisement infrastructure 201 or from an external server 271. Similarly, the alumni news, information on events, information on tickets for sale for campus events, etc. originates within the alumni updates and advertisement infrastructure 201 in some configurations, and originates on external servers 271 in some other configurations.

In some configurations, the alumni updates and advertisement infrastructure 201 supports multiple universities, and facilitates retrieving and providing alumni news, information on events, information on tickets for sale for campus events etc. for those multiple universities. This involves, in one related embodiment, interactions with external servers 271 associated with those multiple universities, retrieval of alumni news from those servers 271, and communicating relevant alumni news and sales offers and advertisements that are appropriate to the user of the digital plaque media panel (while filtering out inappropriate news and information based on user preferences, current configuration, etc.)

In one configuration, the alumni updates and advertisement infrastructure 201 also comprises a voice processing search engine 273, which enables user interactions using voice inputs, and providing news and information to a user of the digital plaque media panel as voice outputs. The voice processing search engine 273 is an independent service accessible by the alumni contact management infrastructure 233 in a related configuration, for voice to text translations, for intent discovery, for search result retrieval, etc. In another related configuration, the voice processing search engine 273 is incorporated into the alumni contact management infrastructure 233. For example, the alumni contact management infrastructure 233 receives voice queries and voice instructions from a user of the digital plaque media panel 203, and, in response, retrieves and presents to the digital plaque media panel 203, as necessary, certificates, updates to certificates, data requested, ticket information, reservation status and transactions related information.

In one configuration, the alumni updates and advertisement infrastructure 201 also provides one or more course material available for access by a user employing the digital plaque media panel 203. For example, the course material is video, audio graphics, text and a combination of these that the students in a class at the university receive and experience as part of a course. The user views the course material based on a schedule, or based on convenience. For example, the alumni contact management infrastructure 233, upon receiving a request from the digital plaque media panel for the course material or for other related information, communicates the course material tailored for the user for display on the digital plaque media panel 203. The course material is also made available as streaming media in some configurations, provided with the help of streaming services 243. Such streaming media is a live streaming media of a live class session in some configurations, while it is streaming media for a previously recorded class in some other configurations.

In one configuration of the alumni updates and advertisement infrastructure 201, the alumni contact management infrastructure 233 determines appropriate courses and programs and communicates these to the digital plaque media panel 203 for display to the user, wherein the training appropriate courses and programs comprise new classes, certificate programs, advanced courses and remedial courses. The user of the digital plaque media panel 203 can select from a list of courses presented, schedule some of them, order others, make optional payments for these courses, and receive corresponding course materials (reading material, notes, homework, cheat sheets, etc.) based on a schedule for those courses.

In one configuration of the alumni updates and advertisement infrastructure 201, the determination of the appropriate courses and programs for a user is based on transcript information associated with the user. Such transcript data is available with the alumni updates and advertisement infrastructure 201 and used to determine what is appropriate for the user. In some related configurations, the digital plaque media panel 203 has the transcript data to filter out unrelated query response, or to narrow down search queries sent to the alumni contact management infrastructure 233 or to external servers 271.

In one configuration of the alumni updates and advertisement infrastructure 201, the determination of the appropriate courses and programs is based on a certificate currently displayed on the digital plaque media panel 203.

In one configuration of the alumni updates and advertisement infrastructure 201, the alumni contact management infrastructure 233 communicates to the digital plaque media panel 203, for purchase or reservation by the user, information on: tickets to sporting events, tickets to social events, classes on offer, spirit wear on sale, books on sale and memorabilia on sale.

Figure 3:
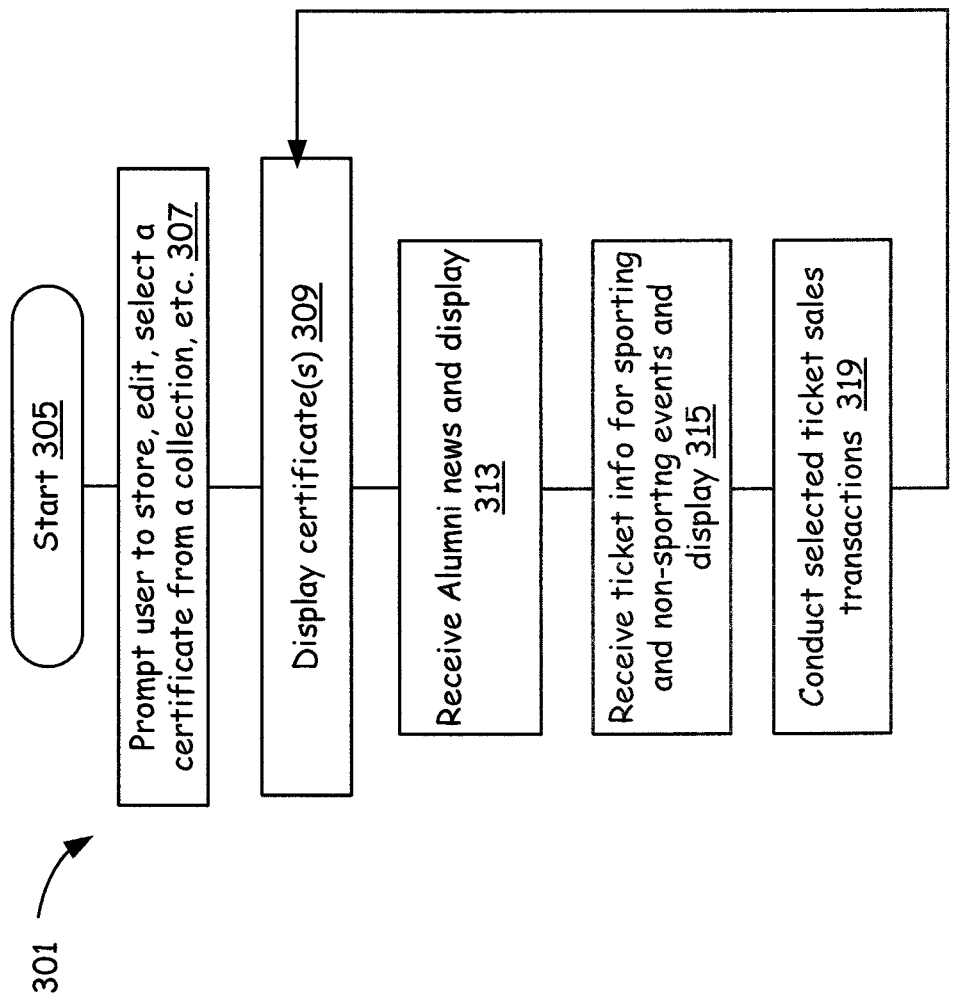
FIG. 3 is an exemplary operation of the digital plaque media panel as it displays a certificate selected by a user, and also facilitates sales transaction for tickets on sale for sporting and non-sporting events notifies by the alumni contact management infrastructure.

FIG. 3 is an exemplary operation of the digital plaque media panel 203 as it displays a certificate selected by a user, and also facilitates sales transaction for tickets on sale for sporting and non-sporting events notifies by the alumni contact management infrastructure 233. At a start block 305, the processing starts when the user activates the selection of a certificate for display on the digital plaque media panel 203. Then, at a next block 307, the user is prompted to select, optionally edit, and store, a certificate (or multiple if applicable) from a list of certificates retrieved. The certificate is a graduation certificate from a university or a certificate for the successful completion of a course or program offered by an educational institution. At a next block 309, the digital plaque media panel 203 displays the certificates stored—usually a user displays one certificate at a time, although the user can choose to display more than one at the same time. The user can also configure the digital plaque media panel 203 to loop through a set of certificates selected, each displayed for a specified duration before being replaced by another. The user can also configure the digital plaque media panel 203 to randomly display certificates from a set selected.

Then, at a next block 313, the digital plaque media panel 203 receives alumni news and displays it. The actual alumni news received is configurable—and the receipt/retrieval of such news is based on several parameters including prior membership of the user in clubs, sport teams, membership in projects or programs on campus, registration in specific majors and minors, etc.

At a next block 315, the digital plaque media panel 203 receives and displays to the user information on tickets available for sporting events and non-sporting events on campus, for various sports, musical events, parties, etc. The user can ignore such information, or retrieve addition details, such as price, availability, location, demand, deadlines, etc.

At a next block 319, the digital plaque media panel 203, after receiving user inputs and selections to sales offers displayed for tickets to sporting and non-sporting events, conducts selected ticket sales transactions. Such sales transactions also selectively involves allowing the user to specify preferences, select seating in venues, provide payment account 227 details if not provided yet, etc. The tickets selected are delivered to the user via the digital plaque media panel 203 after successful completion of corresponding sales transactions. The operation then transitions back to the block 309 where the digital plaque media panel 203 resumes the display of a currently selected certificate.

As one of ordinary skill in the art will appreciate, the term "certificate" used herein includes graduation certificates, certificates received from training programs, certificates received for the completion of coursework, certificates received as a result of some tests, etc.

As one of ordinary skill in the art will appreciate, the term "infrastructure" used herein also includes a collection of servers or computers used collectively to provide a service, or a collection of computing devices that cooperate to provide one or more services. It also includes an integrated environment where servers in the cloud are communicatively coupled to several computers or electronic devices that are geographically distributed.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

It must be clear that the present invention, although specified for digital plaque media panels, also applies to other types of devices including mobile devices, laptops with a browser, a hand held device such as a PDA, a television, a set-top-box, a media center at home, robots, robotic devices, vehicles capable of navigation, and a computer communicatively coupled to the network.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

We claim:

1. A digital plaque media panel comprising:
a processor;
a communications circuitry;
a touch sensitive screen that interacts with the processor, and under instructions from the processor, retrieves and displays for one individual user a series of certificates, one after another in random order or in a specified order;
a voice interaction circuitry employed by the individual user to interact with the digital plaque media panel;
the processor receives promotional material tailored for that individual user and displays it on the touch sensitive screen, and in response, receives and process user queries and user responses via the voice interaction circuitry; and
the processor selectively conducts follow up transactions for the individual user;
wherein the series of certificates issued by and associated with an educational institution are retrieved from an external alumni updates and advertisement infrastructure, wherein the educational institution is an alma mater associated with the individual user, and wherein the external alumni updates and advertisement infrastructure provides alma mater related news and information periodically or as needed to the individual user based on a configuration.

2. The digital plaque media panel of claim 1 wherein the series of certificates comprise one or more of graduation certificates, advanced training certificates, course completion certificates, transcripts and test score certificate.

3. The digital plaque media panel of claim 1 wherein the series of certificates comprise one or more certificates issued by and associated with an educational institution.

4. The digital plaque media panel of claim 1 wherein the processor receives user queries via the voice interaction circuitry and communicates it to a remote server for deciphering intent and questions, and in response receives information and data for display.

5. The digital plaque media panel of claim 4 wherein the received information data for display comprises an update to one of the currently displayed series of certificates.

6. The digital plaque media panel of claim 4 wherein the received information data for display comprises a price for a product or service requested.

7. The digital plaque media panel of claim 4 wherein the received information data for display comprises a map for further interactions with the individual user.

8. The digital plaque media panel of claim 3 wherein the educational institution is an alma mater associated with the individual user, and wherein the digital plan media panel receives and displays alma mater related news and information, periodically or as needed, to the individual user based on a configuration.

9. The digital plaque media panel of claim 3 wherein the individual user is prompted to purchase or reserve tickets to sporting events, tickets to social events, classes, spirit wear, books and memorabilia.

10. The digital plaque media panel of claim 3 wherein the educational institution is an alma mater of the individual user, and wherein, based on configuration, the digital plaque media panel automatically plays a video, displays flags and a mascot, or plays alma mater related songs when it receives notifications of a sports win, or other good news, from an alumni updates and advertisement infrastructure.

11. An alumni updates and advertisement infrastructure comprising:
an alumni contact management infrastructure;
a payment account; and
a digital plaque media panel that displays certificates and provides for user interactions;
wherein the digital plaque media panel programs the alumni contact management infrastructure to deliver alumni news updates, offers and advertisements;
wherein the alumni contact management infrastructure delivers updates to alumni news, alma mater news, events information, offers and advertisements, via an update channel; and
wherein the digital plaque media panel receives and displays advertisements from the alumni contact management infrastructure securely;
a course material available for access by a user employing the digital plaque media panel; and
the alumni contact management infrastructure, upon receiving a request from the digital plaque media panel for the course material or for other related information, communicating the course material tailored for the user for display on the digital plaque media panel.

12. The alumni updates and advertisement infrastructure of claim 11 wherein the digital plaque media panel receives alumni news, alma mater news, events information, offers and advertisements comprises based on user personalization.

13. The alumni updates and advertisement infrastructure of claim 12 wherein the user personalization comprises certificates on display on the digital plaque media panel and past payment transactions information.

14. The alumni updates and advertisement infrastructure of claim 12 further comprising:
a voice processing search engine;
the alumni contact management infrastructure receives voice queries and voice instructions from a user of the digital plaque media panel, and, in response, retrieves and presents to the digital plaque media panel, as necessary, certificates, updates to certificates, data requested, ticket information, reservation status and transactions related information.

15. The alumni updates and advertisement infrastructure of claim 11 wherein the alumni contact management infrastructure determines appropriate courses and programs and communicates these to the digital plaque media panel for display to the user, wherein the training appropriate courses and programs comprise new classes, certificate programs, advanced courses and remedial courses.

16. The alumni updates and advertisement infrastructure of claim 15 wherein the determination of the appropriate courses and programs is based on transcript information associated with the user.

17. The alumni updates and advertisement infrastructure of claim 15 wherein the determination of the appropriate courses and programs is based on a certificate currently displayed on the digital plaque media panel.

18. The alumni updates and advertisement infrastructure of claim 11 wherein the alumni contact management infrastructure communicates to the digital plaque media panel, for purchase or reservation by the user, information on: tickets to sporting events; tickets to social events; classes on offer; spirit wear on sale; books on sale and memorabilia on sale.

\* \* \* \* \*